(12) United States Patent
Kim et al.

(10) Patent No.: US 6,262,542 B1
(45) Date of Patent: Jul. 17, 2001

(54) ELECTRONIC BALLAST SYSTEM

(75) Inventors: Dae-Bong Kim, Incheon; Nak-Choon Choi, Bucheon, both of (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 09/574,276

(22) Filed: May 19, 2000

(30) Foreign Application Priority Data

May 19, 1999 (KR) .................................................. 99-18016

(51) Int. Cl.$^7$ ...................................................... H05B 37/02
(52) U.S. Cl. ...................... 315/224; 315/209 R; 315/307; 315/291; 315/308
(58) Field of Search ............................... 315/209 R, 224, 315/244, 247, 276, 291, 307, 308, DIG. 7, DIG. 4

(56) References Cited

U.S. PATENT DOCUMENTS

| | | | | |
|---|---|---|---|---|
| 4,717,863 | * | 1/1988 | Zeiler .................................... | 315/307 |
| 5,612,597 | * | 3/1997 | Wood .................................... | 315/293 |
| 5,969,482 | * | 10/1999 | Gradzki ................................. | 315/224 |
| 5,973,437 | * | 10/1999 | Gradzki et al. ....................... | 310/307 |
| 5,973,455 | * | 10/1999 | Mirskiy et al. ....................... | 315/105 |
| 6,137,240 | * | 10/2000 | Bogdan ................................. | 315/307 |

* cited by examiner

Primary Examiner—Haissa Philogene
(74) Attorney, Agent, or Firm—Marshall, O'Toole, Gerstein, Murray & Borun

(57) ABSTRACT

An electronic ballast for use in illuminating a lamp includes a lamp driving circuit having a pulse-width modulated signal generator, a timing capacitor coupled to the lamp driving circuit, and a power controller. The power controller uses a current sense resistor to detect a current flowing through the lamp and an operational amplifier circuit to compare a signal associated with the detected current to a reference voltage associated with a desired lamp current. Based on the comparison, the power controller provides a correction current to the timing capacitor to control a duty cycle of an output of the pulse-width modulated signal generator.

17 Claims, 3 Drawing Sheets

ELECTRONIC BALLAST SYSTEM

BACKGROUND OF THE INVENTION

1. Field of the Invention

The invention relates generally to electronic ballast systems and, more particularly, the invention relates to an electronic ballast system that controls the duty cycle of a pulse-width modulated lamp drive signal based on a lamp current.

2. Description of Related Technology

Generally speaking, electronic ballast systems initiate a glow discharge within a gas-filled lamp, such as a conventional flourescent lamp, and thereafter maintain a stable supply of power to the lamp to sustain the discharge. As is well known, conventional electronic ballast systems typically include an inverter circuit that supplies alternating current (AC) power to the lamp and a lamp driver circuit, which uses a pulse-width modulated (PWM) control signal to vary the amount of power that the inverter supplies to the lamp.

As is also well known, the inverter circuit typically includes a power switch (e.g., a transistor) that is switched on and off at a frequency determined by the resonance of a timing capacitor and an inductor. In practice, the capacitance of the timing capacitor may deviate about five to ten percent from an ideal value. As a result, the frequency and duty cycle of the PWM control signal may also vary in proportion to the deviation of the capacitance value from the ideal value, thereby changing the amount of power which is delivered to the lamp. Additionally, the variation in the frequency and duty cycle of the PWM signal prevents precise zero voltage switching control of the power switch, which increases the operating temperature of the power switch and significantly reduces its expected operating life.

SUMMARY OF THE INVENTION

In accordance with one aspect of the invention, an electronic ballast for use in illuminating a lamp includes a lamp driving circuit having a pulse-width modulated signal generator, a timing capacitor coupled to the lamp driving circuit, and a power controller. The power controller compares a signal associated with a current flowing through the lamp to a signal associated with a desired lamp current and, based on the comparison, provides a correction current to the timing capacitor to control a duty cycle of an output of the pulse-width modulated signal generator.

In accordance with another aspect of the invention, an electronic ballast system includes a voltage source for supplying power to the electric ballast system and a lamp driving circuit having a first, second and third terminals. The power of the voltage source is supplied through the first terminal to begin the driving of the electronic ballast system, and the lamp driving circuit outputs pulse-width modulated signals through the second and third terminals. The electronic ballast system may further include a half bridge converter having a first end that is connected to the second terminal of the lamp driving circuit and a second end that is connected to the third terminal of the lamp driving circuit. The half bridge converter receives input from the second and third terminals of the lamp driving circuit and outputs a current that changes flow directions according to the pulse-width modulated signals output by the lamp driving circuit. The electronic ballast system may additionally include a lamp portion having a first end connected to an output end of the half bridge converter such that the lamp portion operates according to the current output by the half bridge converter, and a power controller connected between the lamp driving circuit and a common terminal of the half bridge converter and the lamp portion. The power controller may detect an amount of current supplied to the lamp portion and may control a drive frequency of the lamp driving circuit based on the detected amount of current to thereby control an output power of the lamp portion.

The invention itself, together with further objectives and attendant advantages, will best be understood by reference to the following detailed description, taken in conjunction with the accompanying drawings and the appended claims.

DETAILED DESCRIPTION OF THE PREFERRED EMBODIMENTS

The electronic ballast system described herein controls the current flowing through a gaseous discharge type lamp. Generally speaking, the electronic ballast system described herein includes a lamp driving circuit and a power controller that form a feedback loop which measures current flowing though the lamp and which delivers a correction current to a timing capacitor associated with the lamp driving circuit. More specifically, the power controller compares a voltage associated with the current flowing through the lamp to a reference voltage associated with a desired lamp current and, based on the comparison, the power controller produces a correction current which controls the PWM output of the lamp driving circuit to maintain the current flowing through the lamp at a desired predetermined value, despite a deviation of the timing capacitor capacitance from an ideal value.

Figure 1:
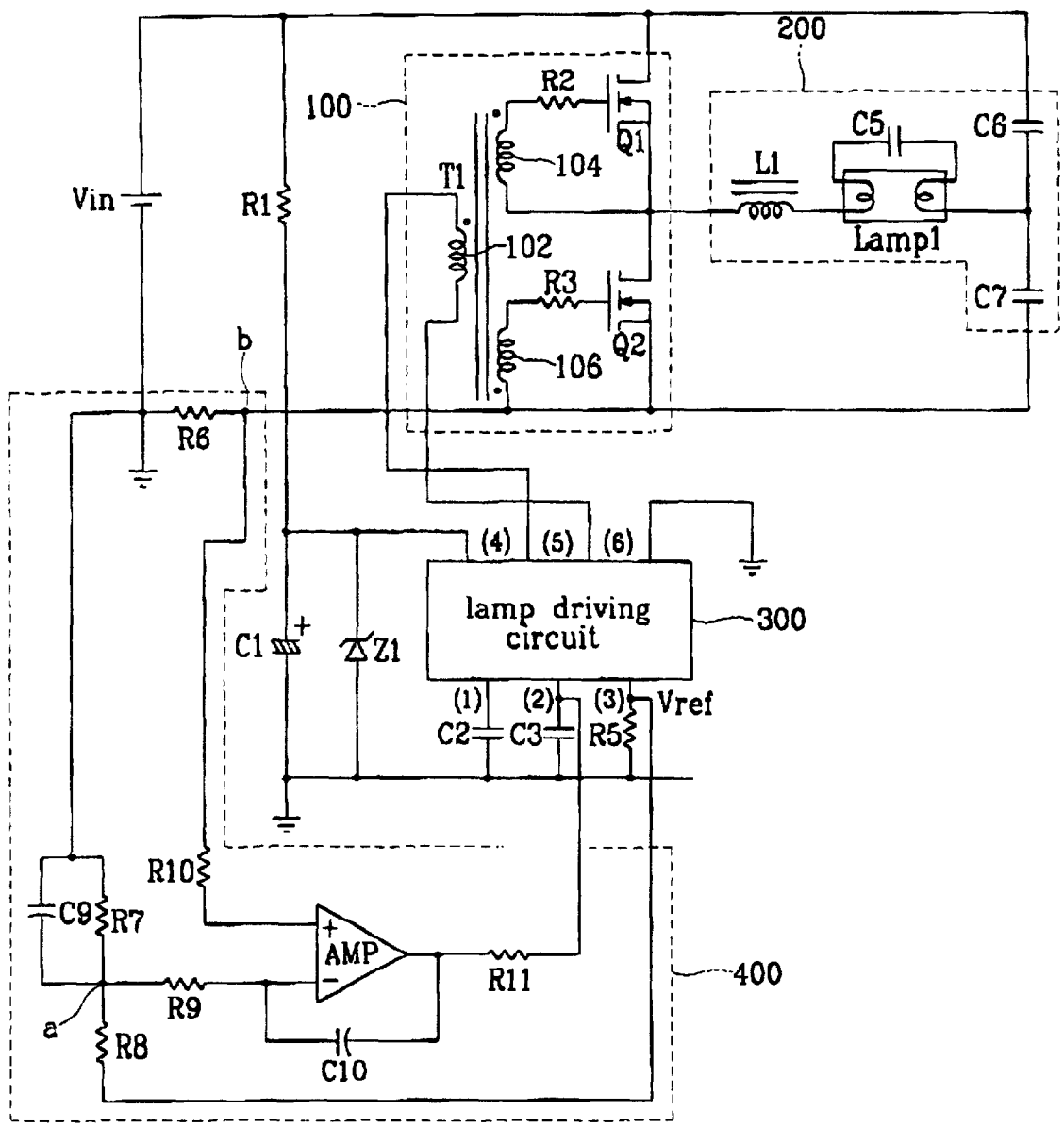
FIG. 1 is an exemplary schematic diagram of an electronic ballast system according to an embodiment of the invention.

FIG. 1 is an exemplary schematic diagram of an electronic ballast according to an embodiment of the invention. The electronic ballast system includes a voltage source Vin, a half bridge convertor 100, a lamp circuit 200, a lamp driving circuit 300, a power controller 400, and a voltage regulator circuit, which is formed by a resistor R1, a capacitor C1 and a zener diode Z1, all connected as shown.

The voltage regulator circuit formed by the resistor R1, the capacitor C1 and the zener diode Z1 is a conventional zener diode voltage regulator circuit, which, in normal operation, provides a regulated direct current (DC) voltage substantially equal to the zener voltage of the zener diode Z1.

The half bridge converter 100 includes a transformer T1, transistors Q1 and Q2, which may be metal oxide semiconductor field effect transistors (MOSFETs) or any other suitable transistors, and resistors R2 and R3. The transformer T1 has a primary winding 102, an upper secondary winding 104 that drives a gate terminal of the transistor Q1 via the resistor R2, and a lower secondary winding 106 that drives a gate terminal of the transistor Q2 via the resistor R3.

The lamp circuit 200 includes a lamp Lamp1, an inductor L1 and capacitors C5–C7, which are all connected as shown in FIG. 1 such that the transistors Q1 and Q2 may be alternately turned on and off to cause an alternating current to flow through Lamp1, thereby illuminating the lamp Lamp1.

The lamp driving circuit 300, which is discussed in greater detail in connection with FIG. 2 below, includes a soft start capacitor C2, a timing capacitor C3, a voltage reference resistor R5, a supply voltage terminal (4) and lamp drive signal output terminals (5) and (6). The lamp drive signal applies an alternating polarity PWM signal across the primary winding 102 of the transformer T1 to alternately turn the transistors Q1 and Q2 on and off. For example, when the polarity of the lamp drive signal causes the current in the primary winding 102 to flow in a clockwise direction (i.e., from terminal (5) to terminal (6)), a counter clockwise current is induced in the upper secondary winding 104 and a clockwise current is induced in the lower secondary winding 106. As a result, the transistor Q2 is off and the transistor Q1 is turned on so that current flows from the input voltage source Vin through the transistor Q1, the inductor L1, the lamp Lamp1, the capacitor C7 and the resistor R6.

On the other hand, when the polarity of the lamp drive signal causes the current in the primary winding 102 to flow in a counter clockwise direction (i.e., from terminal (6) to terminal (5)), a clockwise current is induced in the upper secondary winding 104 and a counter clockwise current is induced in the lower secondary winding 106. As a result, the transistor Q1 is turned off and the transistor Q2 is turned on so that current flows from the input voltage source Vin through the capacitor C6, the lamp Lamp1, the inductor L1, the transistor Q2 and the resistor R6. Thus, the average amount of current and power supplied to the lamp Lamp1 may be controlled by varying the switching frequency and duty cycle of the transistors Q1 and Q2. Additionally, as is generally known, the values selected for the inductor L1 and the capacitors C6 and C7 will determine an optimal resonant frequency for operation of the transistors Q1 and Q2.

The power controller 400 includes a resistive divider formed by resistors R7 and R8, a filter capacitor C9, a current sense resistor R6, and an active integrator circuit, which is formed by operational amplifier AMP, resistors R9–R11 and capacitor C10. The power controller 400 forms a feedback control loop that measures the current flowing through the lamp Lamp1 using the current sense resistor R6, compares this measured current to a desired target value, and delivers a corrective current signal via the output terminal of the operational amplifier AMP and the resistor R11 to the timing capacitor C3.

As will be discussed in greater detail below, the corrective current signal provided by the power controller 400 increases or decreases the charging rate of the timing capacitor C3 to achieve a desired current level in the lamp Lamp1. Thus, if the capacitance of the timing capacitor C3 deviates from a desired ideal value, which affects the charging rate of the timing capacitor C3, the power controller 400 delivers a positive or a negative correction current to the timing capacitor C3, which increases or decreases the charging rate of the timing capacitor C3 so that the current delivered and the power applied to the lamp Lamp1 is maintained at the desired level.

In particular, a voltage Va=Vref(R7/(R7+R8)) is formed at the common node of the resistors R7–R9. Because substantially zero current flows into (or out of) the input terminals of the operational amplifier AMP, the output of the amplifier AMP will vary to cause the current flowing through the lamp Lamp1 to increase or decrease so that the voltage Vb is substantially equal to the voltage Va. Thus, if the current flowing through the lamp Lamp1 is below the desired value, the voltage Vb is less than the voltage Va, the output of the amplifier AMP is negative and produces a correction current that reduces the charging current which is provided to the timing capacitor C3. As a result, the lamp driving circuit 300 increases the duty cycle of the lamp drive signal, which increases the current flowing through the lamp Lamp1.

On the other hand, if the current flowing through the lamp Lamp1 is greater than the desired value, the voltage Vb is greater than the voltage Va, the output of the amplifier AMP is positive and produces a charging current that increases the charging current which is provided to the timing capacitor C3. As a result, the lamp driving circuit decreases the duty cycle of the lamp drive signal, which decreases the current flowing through the lamp Lamp1.

Figure 2:
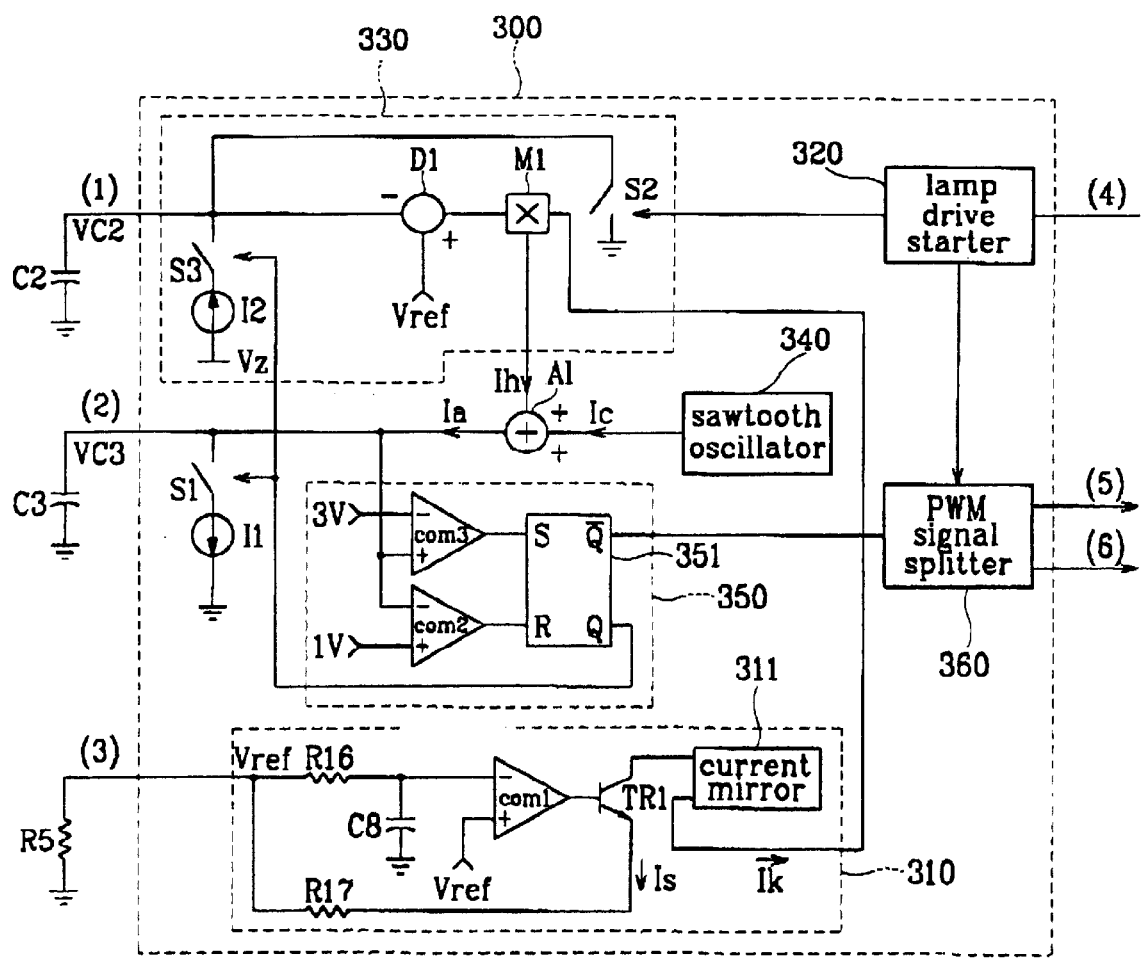
FIG. 2 is a more detailed schematic diagram of the lamp driving circuit of FIG. 1.

FIG. 2 is a more detailed schematic diagram of the lamp driving circuit 300 of FIG. 1. As shown in FIG. 2, the lamp driving circuit 300 includes a reference current generator 310, a lamp drive starter 320, a soft starter 330, a sawtooth oscillator 340, a PWM signal generator 350, and a PWM signal splitter 360. The reference current generator 310 includes a filter capacitor C8, resistors R16 and R17, a comparator COM1, a transistor TR1 and a current mirror 311. A non-inverting input terminal of the comparator COM1 is connected to a reference voltage Vref. As a result, an output terminal of the comparator COM1 drives a base terminal of the transistor TR1 so that the reference voltage Vref is developed across the reference voltage resistor R5 and so that a reference current Is flowing through the transistor TR1 equals Vref/R5. The current mirror 311 receives the reference current Is and generates a proportional current Ik, which is provided to the soft starter 330.

Upon initial power-up, the supply voltage terminal (4) of the lamp driving circuit 300 is at substantially near zero volts. As the capacitor C1 charges, the voltage at the supply voltage terminal (4) increases and when the voltage on supply voltage terminal (4) is greater than a predetermined threshold value, the lamp drive starter 320 controls the soft starter 330 and the PWM signal splitter 360 to enable the lamp driving circuit to drive the converter 100, thereby illuminating the lamp Lamp1.

The soft starter 330 includes a current source I2, switches S2 and S3, a subtractor D1 and a multiplier M1. Upon initial power-up, the switch S2 is OFF and the switch S3 is ON, which causes the voltage across the soft start capacitor C2 to increase at a rate determine by the value of the current source I2 and the capacitance value of the soft start capacitor C2. Those skilled in the art will recognize that a larger capacitance value for the soft start capacitor C2 will increase the soft start interval, whereas a smaller capacitance value for the soft start capacitor C2 will decrease the soft start interval. However, once the voltage supplied to the supply voltage terminal (4) reaches the predetermined threshold level, the lamp drive starter 320 turns the switch S2 ON, which connects the soft start capacitor C2 to a ground potential.

The subtractor D1 subtracts a soft start voltage VC2 from the reference voltage Vref and the multiplier M1 multiples this difference by the current Ik to produce a current Ih. An adder A1 adds the current Ih to the output of the sawtooth oscillator 340, which is a current Ic, to form a resulting current Ia, which equals Ih+Ic or, more specifically, Ia= (Vref−VC2)*Ik+Ic.

The PWM signal generator 350 includes comparators COM2 and COM3 and a latch 351, which is shown by way of example only to be an RS flip-flop. A non-inverting input of the comparator COM2 is connected to a reference voltage of 1 volt and an inverting input of the comparator COM3 is connected to a reference voltage of 3 volts. Additionally, a voltage VC3 across the timing capacitor C3 is connected to the non-inverting input of the comparator COM3 and to the inverting terminal of the comparator COM2. When the voltage VC3 across the timing capacitor C3 is less than 1 volt, an output of the comparator COM2 is at a logical high level (i.e., a logical 1), the output of the comparator COM3 is at a logical low level (i.e., a logical zero), and the latch 351 is reset so that the Q output is at a logical low condition and the $\overline{Q}$ output is at a logical high condition. With the Q output in a logical low condition, the switch S1 is OFF and the current Ia and the correction current from the power controller 400 both flow into the timing capacitor C3. As a result, the voltage VC3 across the timing capacitor C3 increases at a rate which is proportional to the sum of the current Ia and the correction current.

When the voltage VC3 across the timing capacitor C3 exceeds 1 volt and is less than 3 volts, the outputs of the comparators COM2 and COM3 are both at a logical low condition and the outputs of the latch 351 do not change. When the voltage VC3 exceeds 3 volts, the output of the comparator COM3 transitions from a logical low condition to a logical high condition, the Q output of the latch 351 transitions to a logical high condition, the $\overline{Q}$ output of the latch 351 transitions to a logical low condition, and the switch S1 is turned ON to discharge the timing capacitor C3 with the current source I1.

Thus, the voltage VC3 across timing capacitor C3 limit cycles between about 1 volt and 3 volts at a frequency and duty cycle that depends on the current Ia, the correction current provided by the power controller 400, and the discharge current provided by the current source I1. Those skilled in the art will recognize that as the correction current supplied by the power controller 400 to the timing capacitor C3 increases, the charging rate of the timing capacitor C3 increases, the duty cycle of the $\overline{Q}$ output and, thus, the duty cycle of the drive signals (5) and (6) at the output of the lamp driving circuit 300 increase, and the current (and power) supplied to the lamp Lamp1 increase. Alternatively, as the correction current supplied by the power controller 400 decreases, the charging rate of the timing capacitor C3 decreases, the duty cycle of the $\overline{Q}$ output and, thus, the duty cycle of the drive signals (5) and (6) at the output of the lamp driving circuit 300 decrease and the current (and power) supplied to the lamp Lamp1 decrease.

Figure 3:
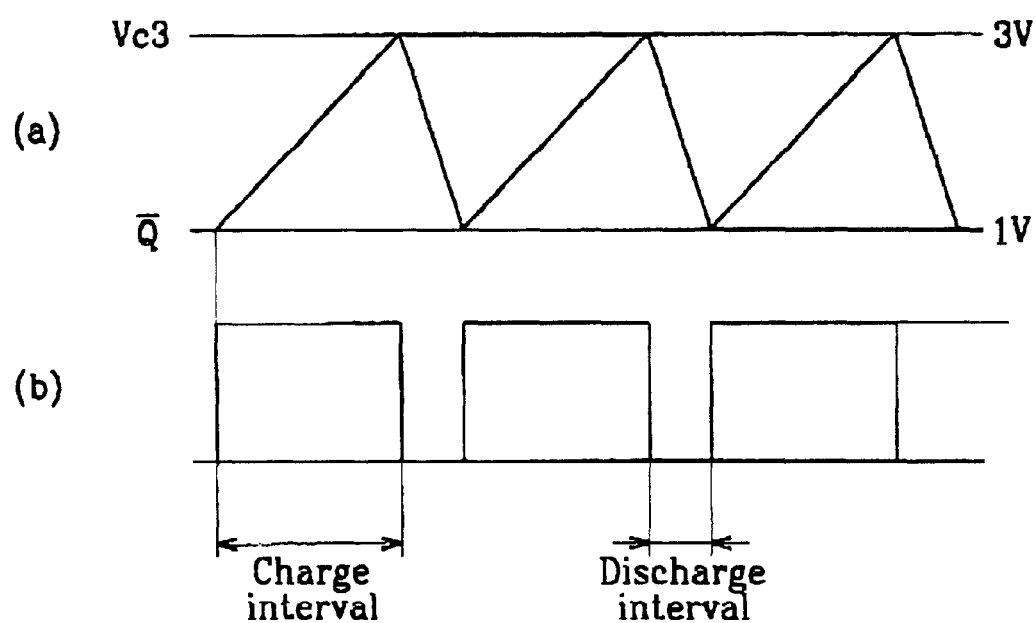
FIG. 3 graphically depicts exemplary operational waveforms associated with the lamp driving circuit of FIG. 2.

FIG. 3 graphically depicts exemplary operational waveforms associated with the lamp driving circuit 300 of FIG. 2. Graph (a) illustrates an exemplary waveform of the voltage VC3 across the timing capacitor C3 and graph (b) illustrates an exemplary waveform of the $\overline{Q}$ output of the latch 351.

A range of changes and modifications can be made to the preferred embodiment described above. The foregoing detailed description should be regarded as illustrative rather than limiting and the following claims, including all equivalents, are intended to define the scope of the invention.

What is claimed is:

1. An electronic ballast for use in illuminating a lamp, comprising:
   a lamp driving circuit having a pulse-width modulated signal generator;
   a timing capacitor coupled to the lamp driving circuit; and
   a power controller that compares a signal associated with a current flowing through the lamp to a signal associated with a desired lamp current and based on the comparison provides a correction current to the timing capacitor to control a duty cycle of an output of the pulse-width modulated signal generator.

2. The electronic ballast of claim 1, wherein the power controller includes a current sense resistor that detects the current flowing through the lamp and an operational amplifier circuit that compares a voltage developed across the current sense resistor to a reference voltage associated with the desired lamp current.

3. The electronic ballast of claim 2, wherein the operational amplifier circuit includes a capacitor connected between an output terminal of the operational amplifier and an inverting input of the operational amplifier.

4. The electronic ballast of claim 1, wherein the pulse-width modulated signal generator further includes:
   a latch circuit having first and second inputs and first and second outputs, wherein the first and second outputs are logical complements of each other;
   a first comparator having a first input terminal coupled to a first reference voltage, a second input terminal coupled to the timing capacitor and an output terminal coupled to the first input of the latch; and
   a second comparator having a first input terminal coupled to a second reference voltage that is different from the first reference voltage, a second input terminal coupled to the timing capacitor, and an output terminal coupled to the second input of the latch, wherein the first and second comparators cause the logical state of the first and second latch outputs to change in response a voltage across the timing capacitor.

5. The electronic ballast of claim 4, wherein the lamp driving circuit includes a current source and a switch coupled to the current source and the timing capacitor, wherein the operation of the switch is controlled by one of the first and second outputs of the latch to discharge the timing capacitor.

6. The electronic ballast of claim 1, wherein the lamp driving circuit further includes:
   a lamp drive starter circuit coupled to a supply voltage that enables the operation of the lamp driver circuit when the supply voltage exceeds a predetermined level;
   a soft starter circuit coupled to the lamp drive starter circuit;
   a reference current circuit that provides a reference current to the soft starter circuit;
   a pulse-width modulated signal splitter coupled to the lamp drive starter circuit and the pulse-width signal generator;
   a sawtooth oscillator; and
   an adder coupled to the timing capacitor, the pulse-width modulated signal generator, the sawtooth oscillator and the soft starter circuit, wherein the adder generates a charging current for charging the timing capacitor.

7. An electronic ballast system, comprising:
   a voltage source for supplying power to the electric ballast system;
   a lamp driving circuit having a first terminal, a second terminal, and a third terminal, the power of the voltage source being supplied through the first terminal to begin the driving of the electronic ballast system, and the lamp driving circuit outputting pulse-width modulated signals through the second and third terminals;
   a half bridge converter, a first end of which is connected to the second terminal of the lamp driving circuit and a second end of which is connected to the third terminal of the lamp driving circuit, the half bridge converter receiving input from the second and third terminals of the lamp driving circuit, and the half bridge converter outputting a current which changes flow directions according to the pulse-width modulated signals output by the lamp driving circuit;

a lamp portion, a first end of which is connected to an output end of the half bridge converter, the lamp portion operating according to the current output by the half bridge converter; and a power controller connected between the lamp driving circuit and a common terminal of the half bridge converter and the lamp portion, the power controller detecting an amount of current supplied to the lamp portion and controlling a drive frequency of the lamp driving circuit based on the detected amount of current to control an output power of the lamp portion.

8. The electronic ballast system of claim 7, further comprising:

a first resistor connected between the voltage source and the first terminal of the lamp driving circuit;

a first capacitor connected between a ground potential and the first terminal of the lamp driving circuit, the first capacitor being charged by a current input through the first resistor; and a diode connected between a ground potential and the first terminal of the lamp driving circuit, the diode acting to maintain a charge voltage of the first capacitor above a predetermined potential.

9. The electronic ballast system of claim 7, wherein the lamp driving circuit comprises:

a reference current generator for generating and outputting a reference current;

a lamp drive starter for receiving the power of the voltage source through the first terminal of the lamp driving circuit to begin the operation of the lamp driving circuit;

a soft starter receiving a starting signal from the lamp drive starter and the reference current from the reference current generator, and outputting a lamp initial drive current to soft start the lamp;

a sawtooth oscillator for outputting a sawtooth wave current;

an adder receiving the lamp initial drive current from the soft starter and the sawtooth wave current from the sawtooth oscillator, and adding the lamp initial drive current to the sawtooth wave current and outputting a resulting output current;

a first current source connected to the adder to receive the output current of the adder, the first current source selectively dividing the output current of the adder;

a pulse-width signal generator connected to the adder and the first current source, receiving the output current of the adder, and generating and outputting pulse-width modulated signals; and a pulse-width modulated signal splitter receiving the output pulse-width modulated signals from the pulse-width modulated signal generator and alternately splitting and outputting the pulse-width modulated signals through the second and third terminals of the lamp driving circuit.

10. The electric ballast system of claim 9, further comprising:

a second capacitor connected between the soft starter and a ground potential, the second capacitor determining a soft starting time;

a third capacitor connected between the ground potential and a common terminal of the adder and the pulse-width modulated signal generator, the third capacitor determining a frequency of the pulse-width modulated signals; and a second resistor connected between the reference current generator and the ground potential, the second resistor determining a magnitude of the reference current output by the reference current generator.

11. The electronic ballast system of claim 10, wherein the soft starter comprises:

a first switch connected between the ground potential and the second capacitor, the first switch being controlled to ON if the starting signal of the lamp drive starter is generated, thereby reducing a charge voltage of the second capacitor;

a subtractor connected to a common terminal of the first switch and the second capacitor, the subtractor generating a difference between a reference voltage and the charge voltage of the second capacitor and outputting an output voltage corresponding to the difference; and a multiplier receiving the output voltage of the subtractor and the reference current of the reference current generator and multiplying the output voltage of the subtractor by the reference current of the reference current generator.

12. The electronic ballast system of claim 11, wherein the pulse-width modulated signal generator comprises:

a first comparator receiving a charge voltage of the third capacitor through a first terminal and a first potential through a second terminal, the first comparator comparing the charge voltage of the third capacitor with the first potential and outputting a first comparison value;

a second comparator receiving the charge voltage of the third capacitor through a second terminal and a second potential through a first terminal, the second comparator comparing the charge voltage of the third capacitor with the second potential and outputting a second comparison value; and a latch receiving the first and second comparison values and outputting a latching value based thereon.

13. The electric ballast system of claim 7, wherein the half bridge converter comprises:

a transformer having a primary winding, a first end of the primary winding being connected to the second terminal of the lamp driving circuit and a second end of the primary winding being connected to the third terminal of the lamp driving circuit, and having first and second secondary windings through which the pulse-width modulated signals of the lamp driving circuit are alternately output;

a first metal oxide semiconductor transistor (MOSFET) having a source terminal connected to the voltage source, a gate terminal connected to a first end of the first secondary winding, and a drain terminal connected to a second end of the first secondary winding of the transformer, the first MOSFET performing switching according to an output waveform of the first secondary winding of the transformer; and a second MOSFET having a drain terminal connected to a common terminal of the drain terminal of the first MOSFET and the first secondary winding of the transformer, a gate terminal connected to a first end of the second secondary winding of the transformer, and a source terminal connected to a second end of the second secondary winding of the transformer, the second MOSFET performing switching according to an output waveform of the second secondary winding of the transformer.

14. The electronic ballast system of claim 13, further comprising:
   a third resistor connected between the first secondary winding of the transformer and the gate terminal of the first MOSFET, the third resistor preventing an excess current from flowing to the first MOSFET; and
   a fourth resistor connected between the second secondary winding of the transformer and the gate terminal of the second MOSFET, the fourth resistor preventing an excess current from flowing to the second MOSFET.

15. The electronic ballast system of claim 14, wherein the lamp portion comprises:
   an inductor connected to a common terminal of the first MOSFET and the second MOSFET;
   a lamp, a first end of which is connected to the inductor;
   a fourth capacitor connected across the lamp;
   a fifth capacitor connected between a second end of the lamp and a common terminal of the voltage source and the first MOSFET; and
   a sixth capacitor connected between the source terminal of the second MOSFET and a common terminal of the second end of the lamp and the fourth capacitor.

16. The electronic ballast system of claim 15, wherein the power controller comprises:
   a fifth resistor connected between a ground potential and a common terminal of the sixth capacitor and the second MOSFET, the fifth resistor detecting the current supplied to the lamp portion; and
   a frequency controller connected to the fifth resistor, a common terminal of the second resistor and the reference current generator, and the third capacitor, the frequency controller comparing a voltage detected at one end of the fifth resistor with a voltage at the common terminal of the second resistor and the reference current generator, and increasing the drive frequency of the lamp driving circuit if the voltage at the one end of the fifth resistor is larger and decreasing the drive frequency of the lamp driving circuit if the voltage at the one end of the fifth resistor is smaller.

17. The electronic ballast system of claim 16, wherein the frequency controller comprises:
   a sixth resistor connected to a common terminal of the fifth resistor and the sixth capacitor;
   a seventh resistor, a first end of which is coupled to the ground potential;
   a seventh capacitor connected in parallel to the first end and a second end of the seventh resistor;
   an eighth resistor connected between the common terminal of the second resistor and the reference current generator and the second end of the seventh resistor;
   a ninth resistor, one end of which is connected to a common terminal of the seventh resistor, the eighth resistor, and the seventh capacitor;
   an amplifier, a first terminal of which is connected to the sixth resistor and a second terminal of which is connected to the ninth resistor;
   a tenth resistor connected between an output terminal of the amplifier and a common terminal the third capacitor, the adder, and the pulse-width signal generator; and
   an eighth capacitor connected between the second terminal of the amplifier and the output terminal of the amplifier.

* * * * *